J. B. Margeson

Jointing Stair Rails.

No. 108,803.   Patented Nov. 1, 1870.

Witnesses
N. P. Kemp
E. B. Gill

Inventor
J. B. Margeson
by B. W. Williams & Son
Attys.

United States Patent Office.

JOHN B. MARGESON, OF LYNN, MASSACHUSETTS.

Letters Patent No. 108,803, dated November 1, 1870; antedated October 29, 1870.

IMPROVEMENT IN MACHINES FOR JOINTING STAIR-RAILS.

The Schedule referred to in these Letters Patent and making part of the same.

I, JOHN B. MARGESON, of Lynn, in the county of Essex and State of Massachusetts, have invented certain Improvements in a Stair-rail-jointing Machine, of which the following is a specification.

The object of my invention is to cut square and true the ends of the several pieces of stair-rails, whether straight or curved, so that a perfect joint may be obtained.

My invention relates—

First, to a peculiarly-constructed face-plate, with knives, &c., attached, for the purpose of cutting or shaving the end of a piece of stair-rail, and of assisting to hold the piece in proper position, said face-plate being used in connection with a stair-rail-jointing machine.

Second, to a little device, running on a track, for the purpose of holding the piece of stair-rail firmly in place, and at a proper angle, while being cut.

In the accompanying drawing—

Figure 1:
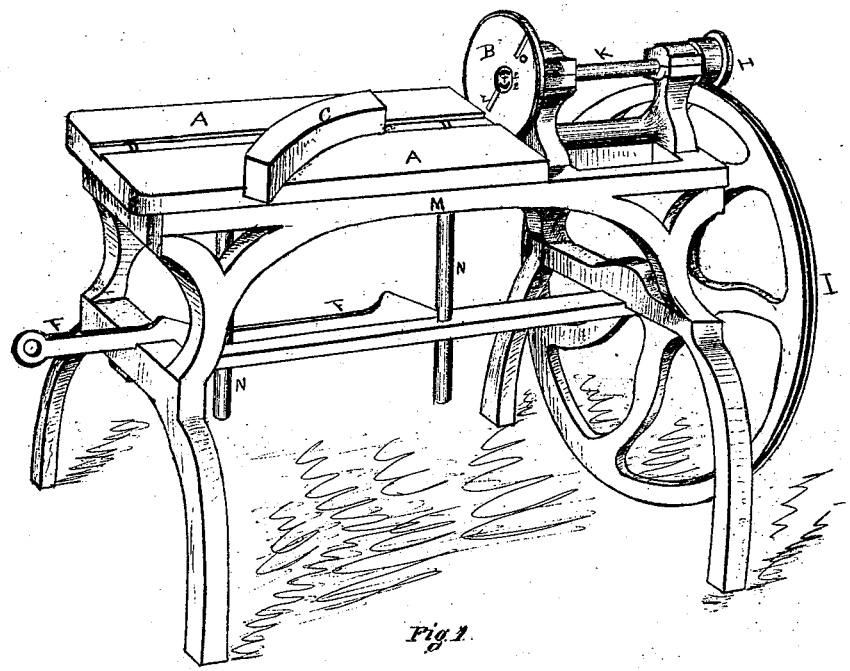
Figure 1 is a side elevation of a machine embodying my invention.
Figure 2:
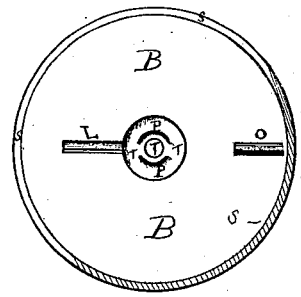
Figure 2 is an enlarged view of the face-plate, with the knives, &c., attached.
Figure 3:
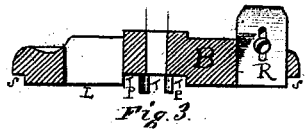
Figure 3 is a sectional view of my face-plate, showing the position and construction of the knives, &c.
Figure 4:
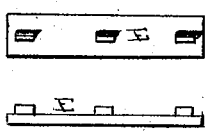
Figure 4 shows the device which, being driven into the piece of stair-rail, runs up against the face-plate, and causes the end of the rail to be evenly cut.

A is the flat board resting upon the top of the machine M, with the groove D in it, upon which the stock is laid and the work performed.

B is the face-plate, with two cutters or knives, L and O, attached, revolving by means of the shaft K.

C is the stock or piece of stair-rail which is to be cut.

D is the groove or track into which the device E fits and runs.

E is the device which is driven onto the piece of rail by means of three points or projections, and, when securely fastened to the piece of rail, serves to guide it up to the face-plate, and to hold it firmly while being cut.

F is a common device, which serves to heighten the flat board A, when desired.

H is the small wheel, which, by means of the shaft K, turns the face-plate.

I is the driving-wheel, which turns the small wheel H.

K is a shaft connecting the wheel H with the face plate.

L and O are knives or cutters attached to the face-plate, somewhat like the cutter in a common plane, and placed one near the center and one near the outer edge of the face-plate, so that the whole end of the stock may be cut or shaved at each revolution of the face-plate.

P P are two projections or points, for the purpose of holding the stock in place while being shaved. The stock is placed against them until they enter it and hold it in place.

R shows the back of the knife O.

S S S represent a "rabbet," or a place extending around the outer edge of the face-plate, cut in slightly from the plate. The object is to allow the uncut wood to enter that portion of the stock which may extend beyond the reach of the knives. If it were not for this rabbet, as soon as the knives commenced to cut a little that part of the stock unreached by the knives would prevent the knives from reaching the stock.

T T T represent a hole in the center of the plate for the same purpose, exactly, as the rabbet S S S. About one-third of the distance from the circumference of this hole T to its center appear the projections P P, spoken of above.

My device E is usually about three-eighths of an inch thick, five-eighths wide, and about eight inches long.

My machine can be used by foot, hand, or steam-power, as desired.

My machine is especially adapted for nice work, and, I think, surpasses anything ever got up for the purpose.

I claim as my invention—

1. The face-plate B, having knives O and L, projections P P, and recesses S T, the whole being constructed as shown and described, and for the purpose specified.

2. The face-plate B, constructed as described, in combination with the sliding dog E and table A, substantially as and for the purpose set forth.

JOHN B. MARGESON.

Witnesses:
H. W. WILLIAMS,
N. P. KEMP.